(12) United States Patent
Rawoof et al.

(10) Patent No.: US 12,137,146 B1
(45) Date of Patent: Nov. 5, 2024

(54) HYBRID BI-DIRECTIONAL USER EXPERIENCE BETWEEN MULTIPLE STACKS

(71) Applicant: INTUIT INC., Mountain View, CA (US)

(72) Inventors: Ismail Rawoof, Toronto (CA); Mark Jaeckle, Toronto (CA); Natalia Castagna, Toronto (CA)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/361,795

(22) Filed: Jul. 28, 2023

(51) Int. Cl.
*H04L 67/148* (2022.01)
*H04L 67/10* (2022.01)

(52) U.S. Cl.
CPC ............ *H04L 67/148* (2013.01); *H04L 67/10* (2013.01)

(58) Field of Classification Search
CPC .............................. H04L 67/148; H04L 67/10
See application file for complete search history.

(56) References Cited

U.S. PATENT DOCUMENTS

| | | | | |
|---|---|---|---|---|
| 8,850,426 B2* | 9/2014 | Glikson | ............... | G06F 9/45558 709/227 |
| 2013/0282791 A1* | 10/2013 | Kruglick | ............... | G06F 16/214 709/217 |
| 2018/0074816 A1* | 3/2018 | Moss | .................. | H04L 41/0813 |

* cited by examiner

*Primary Examiner* — Soe Hlaing
(74) *Attorney, Agent, or Firm* — DLA Piper LLP US (57) ABSTRACT

A system and method that leverage a hybrid bi-directional user experience system that bi-directionally transfers an application session between a first application and a migrated application based on the availability of application features in the migrated application stack.

18 Claims, 7 Drawing Sheets

HYBRID BI-DIRECTIONAL USER EXPERIENCE BETWEEN MULTIPLE STACKS

BACKGROUND

Conventionally in system life cycles, application or component migrations are performed which may include migrations from one computing environment to another, from one application version to another or from one application customization to another. Application migration may involve techniques such as re-host, refactor, re-platform or replace with data generally going in one direction (i.e., old to new). This uni-directional application migration leads to problems when users are transferred to a migrated version of the application that may suffer from various hardware and/or software deficiencies (e.g., errors, bugs, etc.) and/or may require the new application to be fully developed in features when compared to the old application.

SUMMARY

Embodiments disclosed herein solve the aforementioned technical problems and may provide other technical solutions as well. Contrary to conventional techniques, the system disclosed herein implements a hybrid bi-directional user experience between application stacks, where one of the application stacks is the original stack (herein referred to as the legacy stack or application alpha) and the other of the application stacks is a migrated or replacement version of the legacy stack (herein referred to as the migrated stack or application beta). The application migration may be a migration of hardware, software or a combination of the two. In other words, the legacy stack may be migrated to new hardware, software or both, thereby creating the migrated stack. Furthermore there may be more than two application stacks.

An example embodiment includes a method performed by a processor. The method may comprise executing a first session on a first software application and executing a second session on a second software application, the second software application being a migrated version of the first software application, receiving requests from a user to execute application features, and bi-directionally redirecting the user between the first session executing on the first software application and the second session executing on the second software application based on an availability of the requested application features in the first software application and the second software application.

Another example embodiment includes a system. The system may comprise a non-transitory storage medium storing computer program instructions, and one or more processors configured to execute the computer program instructions to cause operations to be performed. The operations may comprise executing a first session on a first software application and executing a second session on a second software application, where the second software application is a migrated version of the first software application, receiving requests from a user to execute application features, and bi-directionally redirecting the user between the first session executing on the first software application and the second session executing on the second software application based on an availability of the requested application features in the first software application and the second software application.

DETAILED DESCRIPTION OF SEVERAL EMBODIMENTS

To mitigate the above deficiencies, embodiments disclosed herein leverage a hybrid bi-directional user experience system that bi-directionally transfers (i.e. redirects) the application session between a first application (i.e., the legacy stack or application alpha) and a migrated application (i.e., the migrated stack or application beta) based on the availability of application features in the migrated application stack.

In one example, a legacy application stack may be in the process of migrating to the migrated application stack. In other words, the migrated application stack is a migrated version of the legacy stack. This migration may be a migration in computing (i.e., hardware) platforms, a migration in software (e.g., versions, user experiences, etc.) or a combination of both. Regardless of the type of migration being performed, the hybrid bi-directional user experience system disclosed herein allows the user to login to the legacy application and be seamlessly transferred to the migrated application stack based on the availability of application features in the migrated application stack. Once transferred to the migrated application stack, the user can be transferred back to the legacy application stack for various reasons including, but not limited to, features not being available on the migrated application stack, problems occurring in the migrated application stack, etc.

Figure 1:
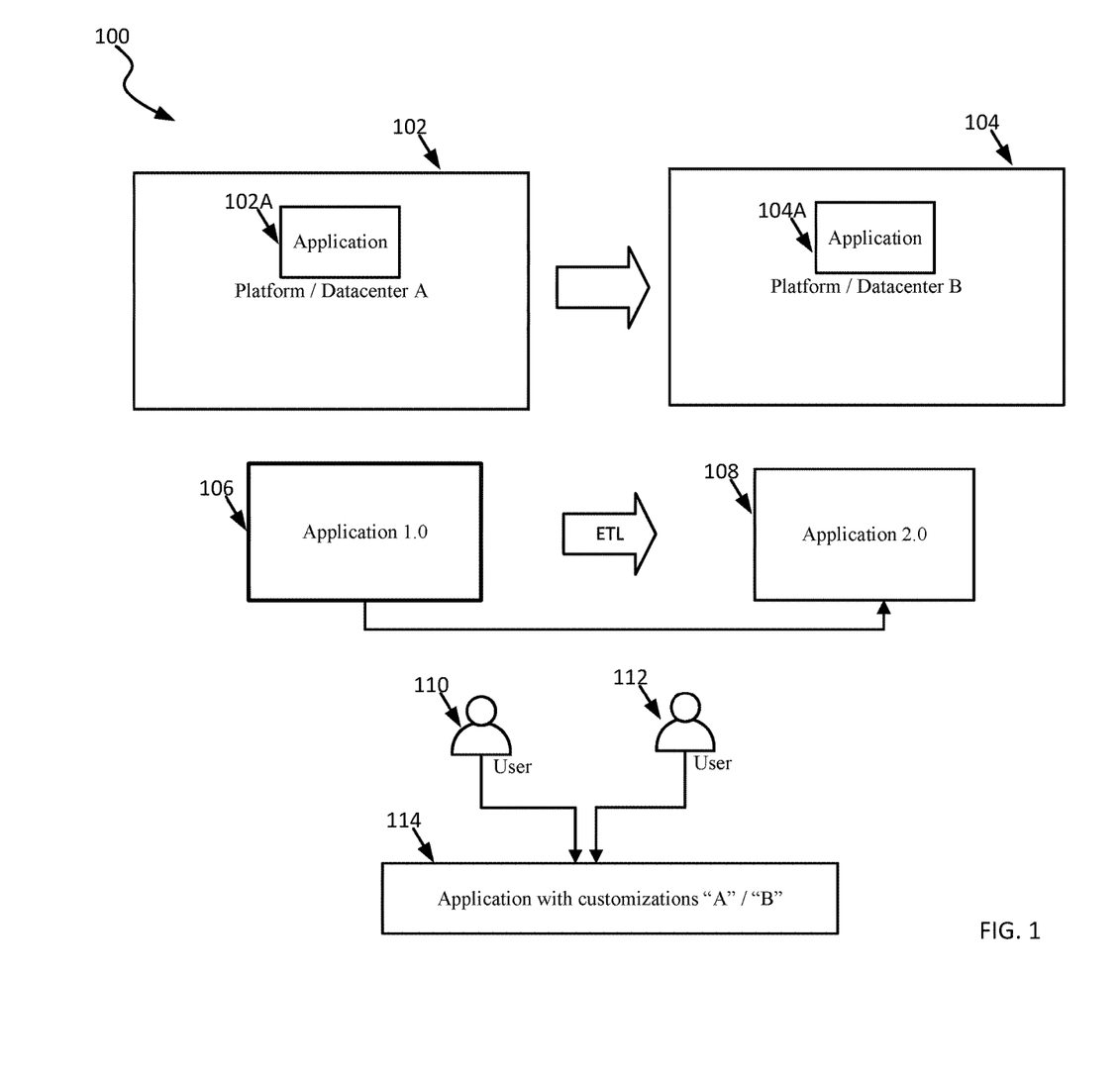
FIG. 1 shows a block diagram of application migration examples, based on the principles disclosed herein.

The above-described features are now described in detail with respect to FIGS. 1-7. FIG. 1 shows a block diagram of application migration examples disclosed herein. Software applications run in various computing environments such as on premise servers or cloud environments. Software application providers may implement a process known as application migration, which moves the software application to a new computing environment and/or updates the software application in some manner. Some forms of application migration include "rehost" where the application is moved between computing environments without significant changes to the application itself, "refactor" where the application goes through recoding efforts to improve the code without changing the overall behavior of the code, "replatform" where the application is moved between computing environments with some changes to the application itself and "replace" where the application is replaced with another application (e.g., new version, etc.). Some reasons for performing application migration include scalability, performance, cost, and security.

Examples of application migration are shown in block diagram 100 of FIG. 1. In one example, application stack 102A (e.g., legacy stack) executing on computing platform 102 is rehosted or replatformed as application stack 104A (e.g., migrated stack) on computing platform 104. In another example, version 1.0 of application 106 may be updated to version 2.0 of application 108. In yet another example, application 114 may be updated to facilitate different user customizations for users 110 and 112. In either of these cases, the application stack is migrated in hardware and/or software from a legacy application stack to a newly migrated application stack.

Application migration is typically executed over a long period of time where the migrated application stack is systematically created and tested by software programmers and users. During the migration process, the system may continue to execute sessions in the legacy application stack while the migrated application stack is being created. However, once the migrated application stack is at least partially functional, it is beneficial to switch the user to a session on the newly migrated application stack to take advantage of and test the new functionality.

The system and method disclosed herein allow the user to take advantage of the new functionality of the migrated application stack while still providing use of the legacy application stack as safety net. Specifically, the system and method disclosed herein provide an application switching and coordinating platform where the user initially logs in to the legacy application stack and is then switched to the migrated application stack when possible. For example, the application switching and coordinating platform may determine if a user requested application feature is available (or not available) on the migrated application stack. If the user requested application feature is available (i.e., launched for use and working properly) on the migrated application stack, the application switching and coordinating platform transfers the user session from the legacy application stack to the migrated application stack. If, at any time during the user session executing on the migrated application stack, the user requests a feature that is not yet available on the migrated application stack or the feature exhibits functional problems, the application switching and coordinating platform transfers the user session back to legacy application stack. In order to ensure proper operation, the application switching and coordinating platform also synchronizes the data sessions between the legacy application stack and migrated application stack. In other words, the user either executes a user session on the legacy application stack or on the migrated application stack, while two coordinated data sessions execute simultaneously on the application stacks. The user sessions on the legacy application stack and the migrated application stack may present respective graphical user interfaces (GUIs) (not shown). In one example, the respective GUIs may have the same look and feel (e.g., same colors, fonts, buttons, graphics, etc.) as one another such that the user does not notice that they have been switched between application stacks. In another example, the respective GUIs may have a different look and feel from one another (e.g., different buttons for new features, etc.).

Figure 2:
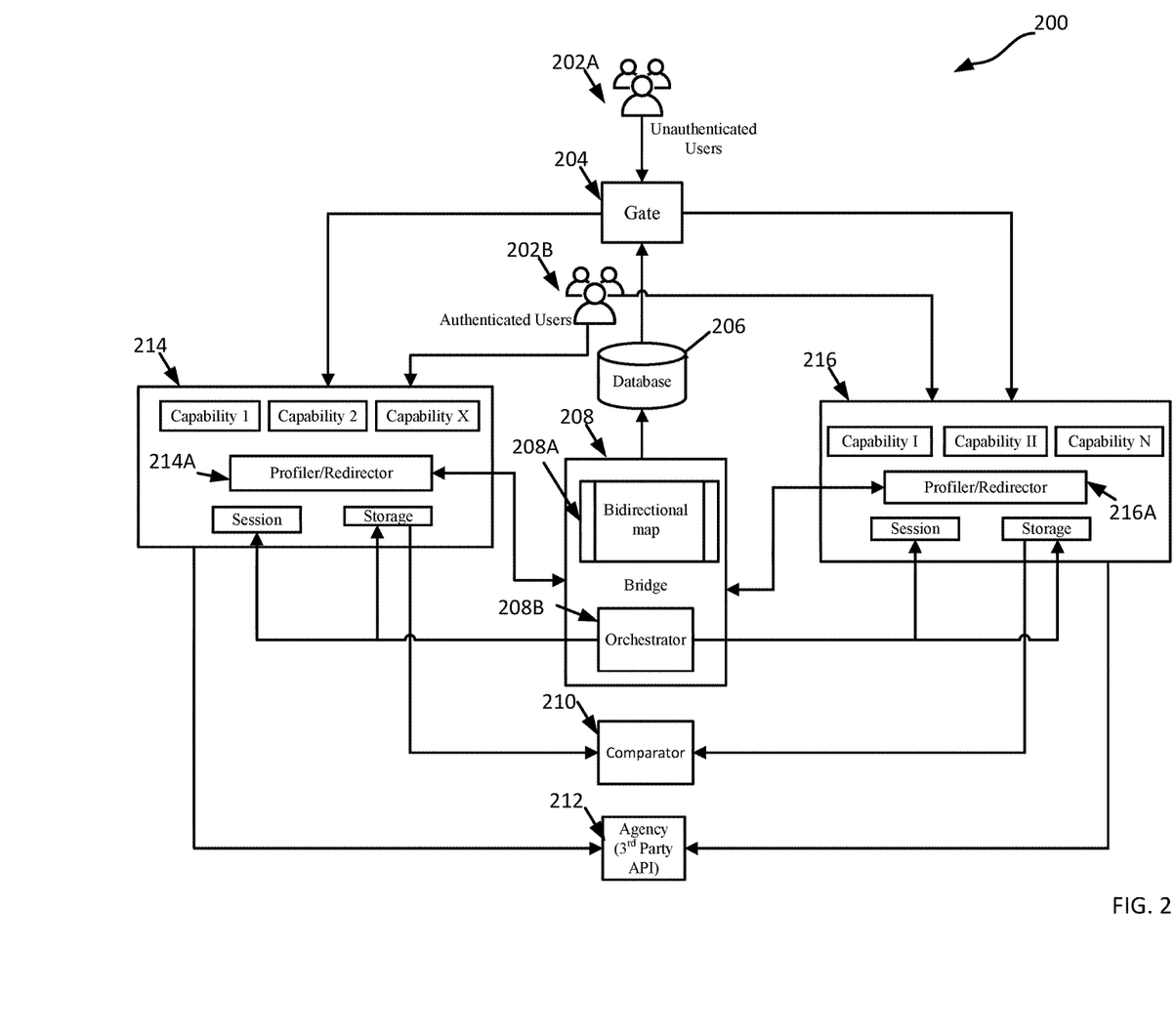
FIG. 2 shows another block diagram of a hybrid bi-directional user experience system, based on the principles disclosed herein.

FIG. 2 shows a block diagram 200 of the hybrid bi-directional user experience system disclosed herein. In general, the hybrid bi-directional user experience system includes three software/hardware entities. The first entity is legacy application stack 214 executing on a computational platform. The second entity is migrated application stack 216 executing on a computational platform that may or may not be the same as the computational platform of legacy application stack 214. The third entity is an application switching and coordinating platform including gate 204, database 206, bridge 208 and comparator 210. Application stacks 214 and 216 may be owned and operated by a $3^{rd}$ party. The application switching and coordinating platform may also informed by an agency or $3^{rd}$ party API 212.

Legacy application stack 214 may include various capabilities (e.g., capability 1, capability 2, capability X, etc.) that are software features executable by the end user. These features may include, but are not limited to, user authentication and access control, data management, searching/filtering, reporting/analytics, workflow automation, application programming interfaces (APIs), notifications/alerts, security/privacy and customization/personalization. Legacy application stack 214 may execute sessions and include a profiler/redirector 214A for monitoring the sessions and coordinating with bridge 208 for determining when to switch (i.e. redirect) the user sessions between application stacks. Although not shown, legacy application stack 214 executes on a computing environment that may include one or more processors, storage devices and communication interfaces.

Similarly, migrated application stack 216 may include various capabilities (e.g., capability I, capability II, capability N, etc.) that are software features executable by the end user. These features may be updates of the capabilities executing on legacy application stack 214, and/or may be new capabilities not present on legacy application stack 214. Migrated application stack 216 may similarly execute sessions and include a profiler/redirector 216A for monitoring the sessions and coordinating with bridge 208 for determining when to switch between application stacks. Although not shown, migrated application stack 216 executes on a computing environment that may include one or more processors, storage devices and communication interfaces. The computing environment may or may not be the same as the computing environment for legacy application stack 214.

As mentioned above, the application switching and coordinating platform may include gate 204, database 206, bridge 208 and comparator 210. More specifically, gate 204 may facilitate user registration and login for gaining access to legacy application stack 214 and migrated application stack 216. Specifically, users 202A may login and be granted access to the application stacks as authenticated users 202B via gate 204. User login can take many forms including user registration, entering of logic credentials, multi-factor authentication, single sign-on for a suite of applications, etc.

In one example, gate 204 may direct authenticated users 202B to execute an initial user session on legacy application stack 214. During the initial user session, the user may request (e.g., click a button) to execute certain requested features (e.g., capability 1) available on legacy application stack 214. Upon requesting to execute the feature, profiler/redirector 214A determines if the requested feature is available on migrated application stack 216. If the requested feature (e.g., capability 1) is available (e.g., capability I) on migrated application stack 216, then profiler/redirector 214A transfers the user session to bridge 208, which transfers the user session to migrated application stack 216A. In other words, the user session initially starts on legacy application stack 214 and is then transferred to migrated application stack 216 when possible (i.e., when programmers have created the feature and made it available on the migrated application stack 216).

More specifically, bidirectional map 208A includes instructions for mapping data from legacy application 214 to migrated application 216 and vice versa. Orchestrator 208B uses the instructions from bidirectional map 208A to facilitate the transfer of data from legacy application 214 to migrated application 216 and vice versa. It is noted that although the user session is transferred from legacy application stack 214 to migrated application stack 216, data sessions exist simultaneously on both legacy application stack 214 and migrated application stack 216 to provide bi-directional switching between the stacks. In order to ensure coordination between data on the simultaneous data sessions, comparator 210 compares the data on each of the simultaneous data sessions executing on legacy application 214 and migrated application 216. If there is any discrepancy, comparator 210 works with orchestrator 208B to correct the discrepancy, thereby ensuring that the data sessions legacy application 214 to migrated application 216 are synchronized. In other words, comparator 210 working with orchestrator 208B may alter data from either data session as needed.

If at any time during the user session on migrated application stack 216, a user requested capability is not available or malfunctioning, profiler/redirector 216A determines that a switch back to the legacy application stack 214 is beneficial. For example, profiler/redirector 216A transfers the user session to bridge 208, which transfers the user session to legacy application stack 214. In other words, the user session initially starts on legacy application stack 214, is transferred over to migrated application stack 216, and is then transferred back to legacy application stack 214.

As mentioned above, bidirectional map 208A includes instructions for mapping data from legacy application 214 to migrated application 216 and vice versa. Orchestrator 208B therefore uses the instructions from bidirectional map 208A to facilitate the transfer of data from migrated application 216 to legacy application 214 and vice versa. It is noted that although the user session is transferred from migrated application stack 216 back to legacy application stack 214, the data sessions continue to exist simultaneously on both legacy application stack 214 and migrated application stack 216 just in case the user session is transferred back to migrated application stack 216.

In other words, the user session may be transferred from legacy application 214 to migrated application 216 and vice versa one or more times depending on various factors. These factors include the availability of features on migrated application 216, while maintaining compatibility with or fulfillment for an external API such as API 212 which may be an agency or $3^{rd}$ party provider to provide these updated features to the end users, operational accuracy of the available features, etc.

Figure 3:
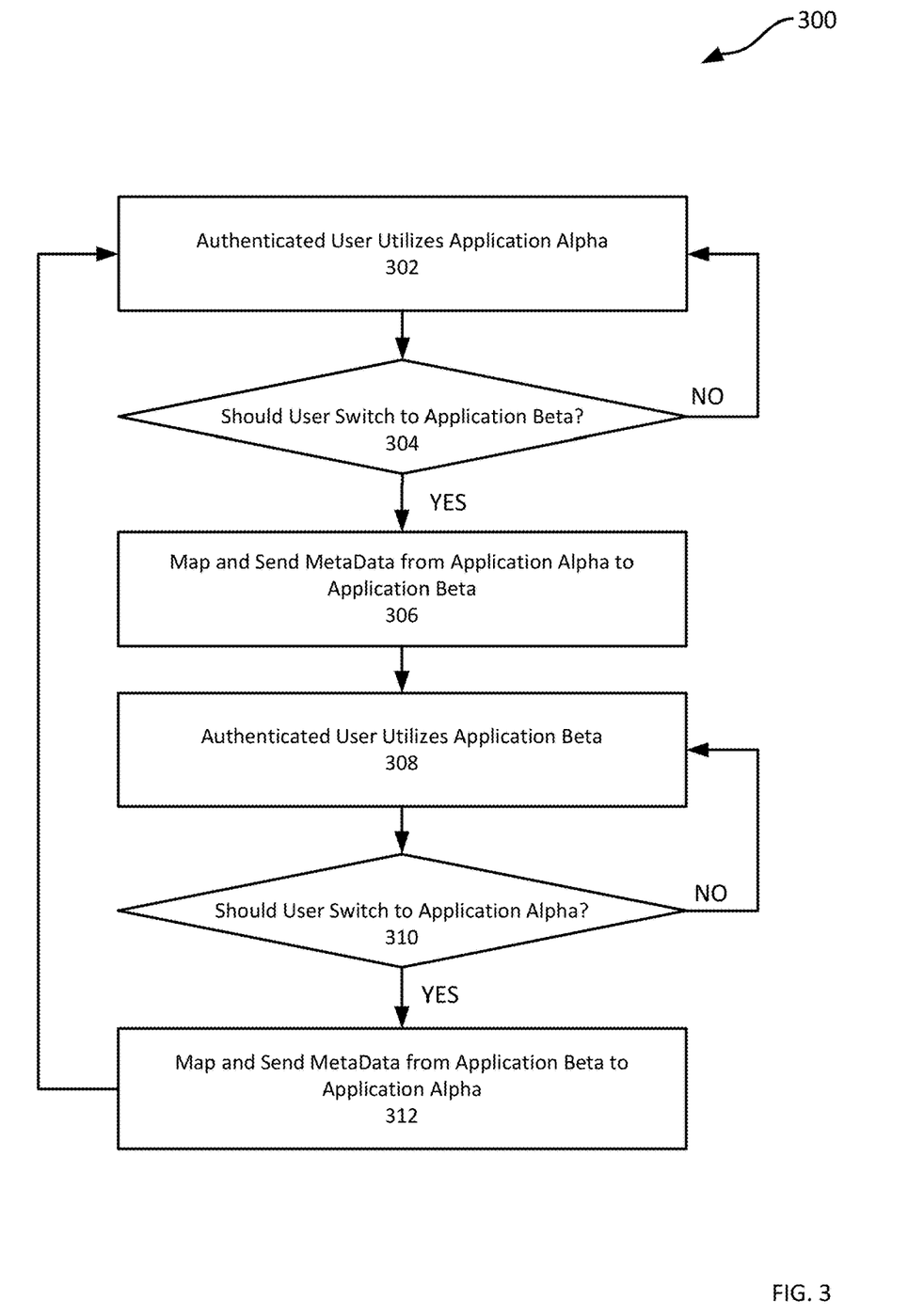
FIG. 3 shows a flowchart for overall operation of the hybrid bi-directional user experience system, based on the principles disclosed herein.
Figure 4:
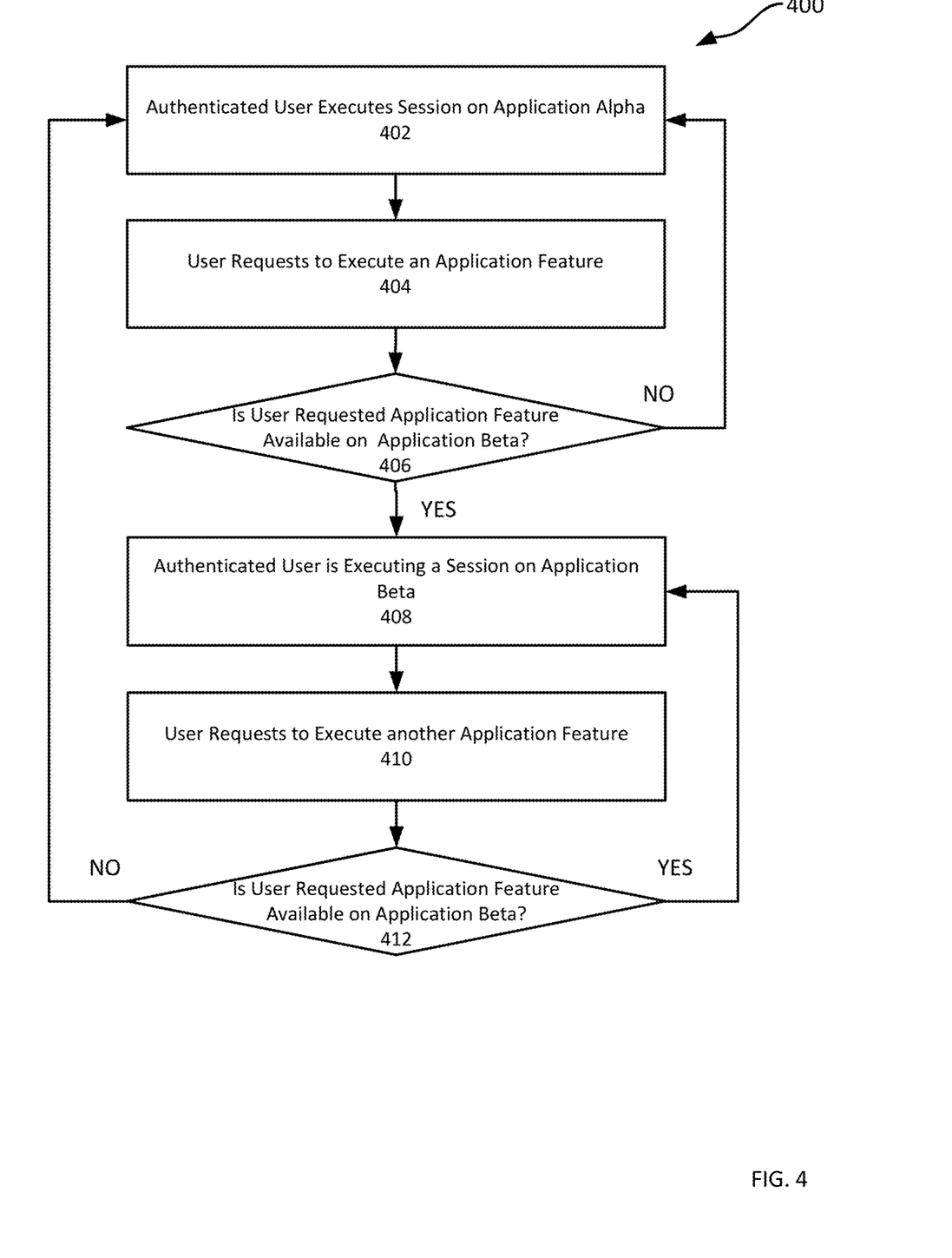
FIG. 4 shows a flowchart for the profiler and redirector of the hybrid bi-directional user experience system, based on the principles disclosed herein.
Figure 5:
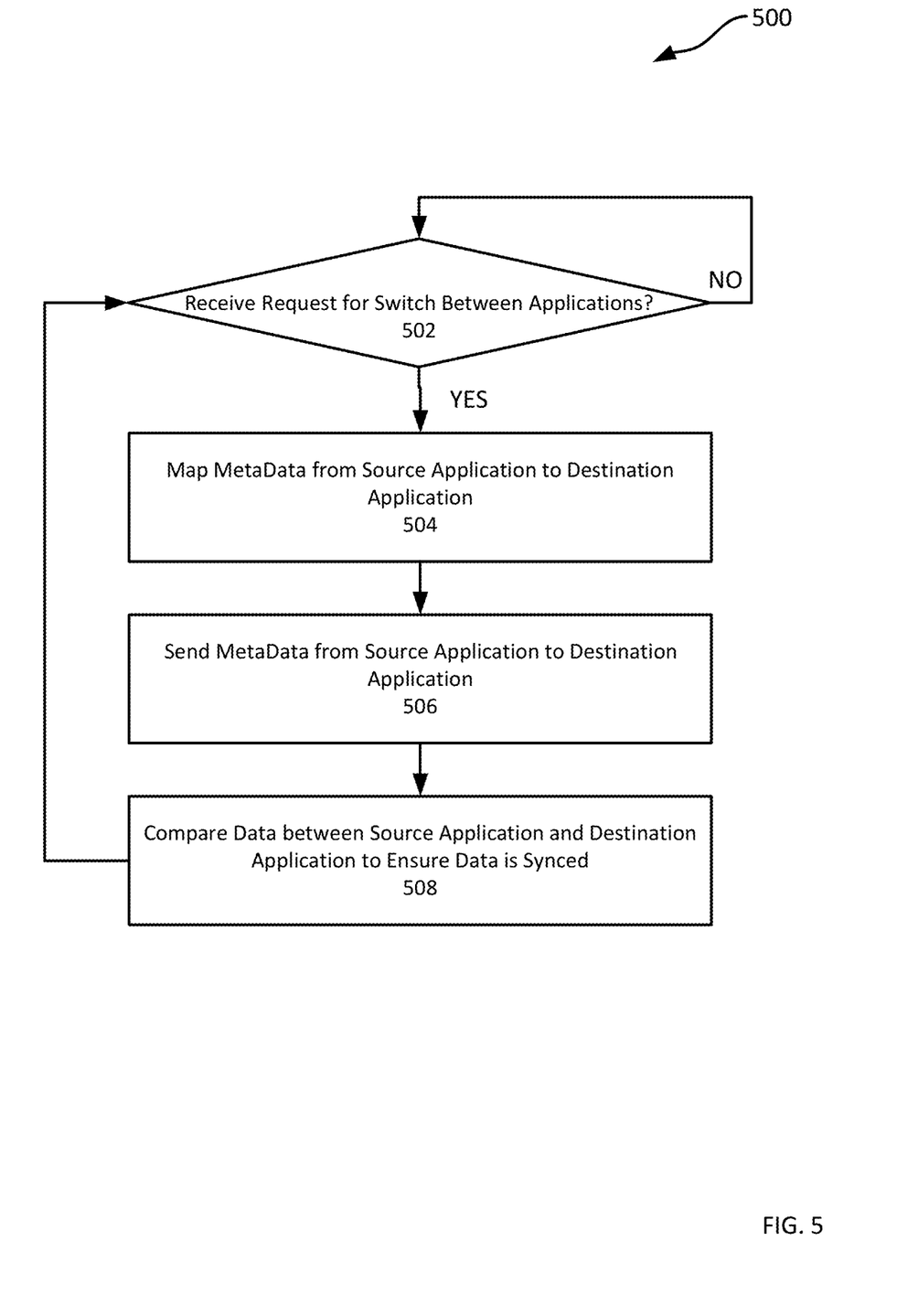
FIG. 5 shows a flowchart for the bridge and comparator of the hybrid bi-directional user experience system, based on the principles disclosed herein.

FIGS. 3-5 discussed below illustrate the operation of the hybrid bi-directional user experience system disclosed herein and shown in FIG. 2. As mentioned above, the system may facilitate bi-directional switching between two application stacks. These application stacks may be the legacy application stack and the migrated application stack, which are referred to in FIGS. 3-5 as application alpha and application beta respectively.

FIG. 3 shows a flowchart 300 for overall operation of the hybrid bi-directional user experience system disclosed herein. In step 302, authenticated users 202B are directed by gate 204 to begin a user session on application alpha 214. As the authenticated user executes the user session on application alpha 214, profiler/redirector 214A determines in step 304 if the user is to be switched to application beta 216. If not, then the user session on application alpha 214 continues (and the method continues at step 302). If a switch is desired (e.g., requested capability is available on application beta 216), then in step 306, profiler/redirector 214A works in conjunction with orchestrator 208B and bidirectional map 208A to map and send the data (e.g., metadata) from application alpha 214 to application beta 216 via profiler/redirector 216A. After the transfer, the user executes a user session on application beta 216 in step 308. As the authenticated user executes the user session on application beta 216, profiler/redirector 216A determines in step 310 if the user is to be switched to application alpha 214. If not, then the user session on application beta 216 continues (and the method continues at step 308). If a switch is desired (e.g., requested capability is not available (not yet launched or problematic) on application beta 216), then in step 312, profiler/redirector 216A works in conjunction with orchestrator 208B and bidirectional map 208A to map and send the data (e.g., metadata) from application beta 216 to application alpha 214 via profiler/redirector 214A. After the transfer, the user executes a user session on application alpha 214 (and the method continues at step 302). This process may be repeated as many times as desired. In other words, the user session can switch between application alpha 214 and application beta 216 multiple times depending on various factors. Although not shown, simultaneous data sessions are stored, updated and coordinated between application alpha 214 and application beta 216 regardless of where the user session is being executed.

FIG. 4 shows a flowchart 400 for the profiler and redirector of the hybrid bi-directional user experience system disclosed herein. As mentioned above, the profiler/redirector determines when to switch between application alpha and application beta. The details are now described. In step 402, the user executes a user session on application alpha 214, and in step 404, the user requests to execute an application feature. In response to the request, profiler/redirector 214A determines, in step 406, if the requested application feature is available on application beta 216. If the requested application feature is not available on application beta 216, then profiler/redirector 214A maintains the user session on application alpha 214 (and the method continues at step 402). However, if the requested application feature is available on application beta 216, then in step 408 profiler/redirector 214A transfers the authenticated user to a user session on application beta 216 via bridge 208 and profiler/redirector 216A. While the user is executing the user session on application beta 216, the user in step 410 may request to execute another application feature. If the requested application feature is available on application beta 216, then in step 412, profiler/redirector 216A maintains the user session on application beta 216 (and the method continues at step 408). However, if the requested application feature is not available on application beta 216, then in step 412, profiler/redirector 216A transfers the authenticated user to a user session on application alpha 214 via bridge 208 and profiler/redirector 214A (and the method continues at step 402).

FIG. 5 shows a flowchart 500 for the bridge and comparator of the hybrid bi-directional user experience system disclosed herein. As mentioned above, the bridge facilitates bi-directional transfers between application alpha and application beta, while the comparator ensures data synchronization between the two data sessions. The details are now described. In step 502, bridge 208 receives a request from profiler/redirector 214 or 216 to switch from a source application (i.e., currently executing application) to a destination application. In step 504, orchestrator 208B uses the mapping rules of bi-directional map 208A to map the data from the source application to the destination application thereby switching user sessions. In step 506, orchestrator 208B sends the mapped metadata from the source application to the destination application. Of course, the data sessions are simultaneously being executed by both the source application and destination application regardless of where the user session is being executed. In order to synchronize these data sessions, comparator 210 in step 508 compares the data between the data sessions and makes any necessary updates to the data.

Figure 6:
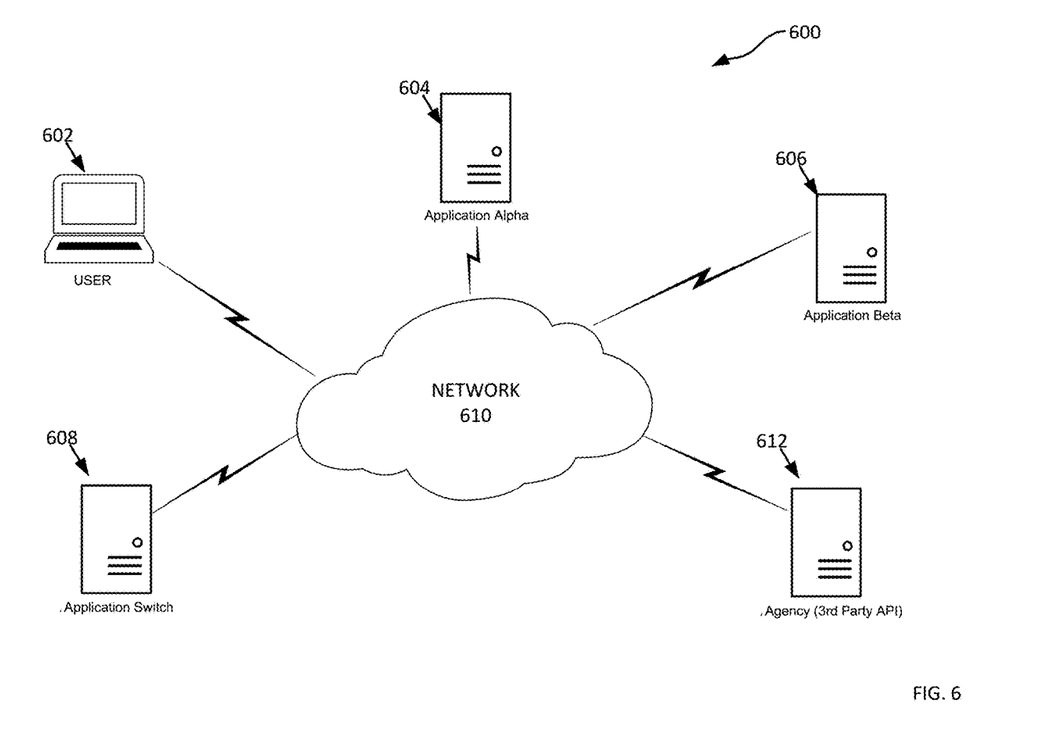
FIG. 6 shows a network diagram of the hybrid bi-directional user experience system, based on the principles disclosed herein.

FIG. 6 shows an example of a system 600 configured for providing the hybrid bi-directional user experience system shown in FIGS. 1 and 2. It should be understood that the components of the system 600 shown in FIG. 6 and described herein are merely examples and systems with additional, alternative, or fewer number of components should be considered within the scope of this disclosure.

As shown, the hybrid bi-directional user experience system 600 comprises at least one end user device 602 and servers 604, 606, 608 and 612 interconnected through a network 610. In the illustrated example, server 604 supports operation of the legacy application stack, server 606 supports operation of the migrated application stack, server 608 supports application control of the hybrid bi-directional user experience, and server 612 supports the agency ($3^{rd}$ party API). In the illustrated example, user device 602 is a PC but may be any device (e.g., smartphone, tablet, etc.) providing access to the servers via network 610. User device 602 has a user interface UI, which may be used to communicate with the servers using the network 610 via a browser or via software applications. For example, user device 602 may allow the user to access the application stacks running on servers 604 and 606, thereby initiating and controlling a desired data migration. The network 610 may be the Internet and or other public or private networks or combinations thereof. The network 610 therefore should be understood to include any type of circuit switching network, packet switching network, or a combination thereof. Non-limiting examples of the network 610 may include a local area network (LAN), metropolitan area network (MAN), wide area network (WAN), and the like.

In an example, end user device 602 may communicate with servers 604, 606, 608 and 612 via a software application to control the hybrid bi-directional user experience system disclosed herein. The software application may initiate server 608 to perform control of the hybrid bi-directional user experience between the legacy application stack on server 604 and the migrated application stack on server 606 according to the systems/methods shown in FIGS. 1-5.

Servers 604, 606, 608, 612 and user device 602 are each depicted as single devices for ease of illustration, but those of ordinary skill in the art will appreciate that servers 604, 606, 608, 612 and user device 602 may be embodied in different forms for different implementations. For example, any or each of the servers may include a plurality of servers including a plurality of databases, etc. Alternatively, the operations performed by any of the servers may be performed on fewer (e.g., one or two) servers. In another example, a plurality of user devices (not shown) may communicate with the servers. Furthermore, a single user may have multiple user devices (not shown), and/or there may be multiple users (not shown) each having their own respective user devices (not shown). Regardless, the hardware configuration shown in FIG. 6 may be a system that supports the functionality of the hybrid bi-directional user experience system shown in FIGS. 1-5.

Figure 7:
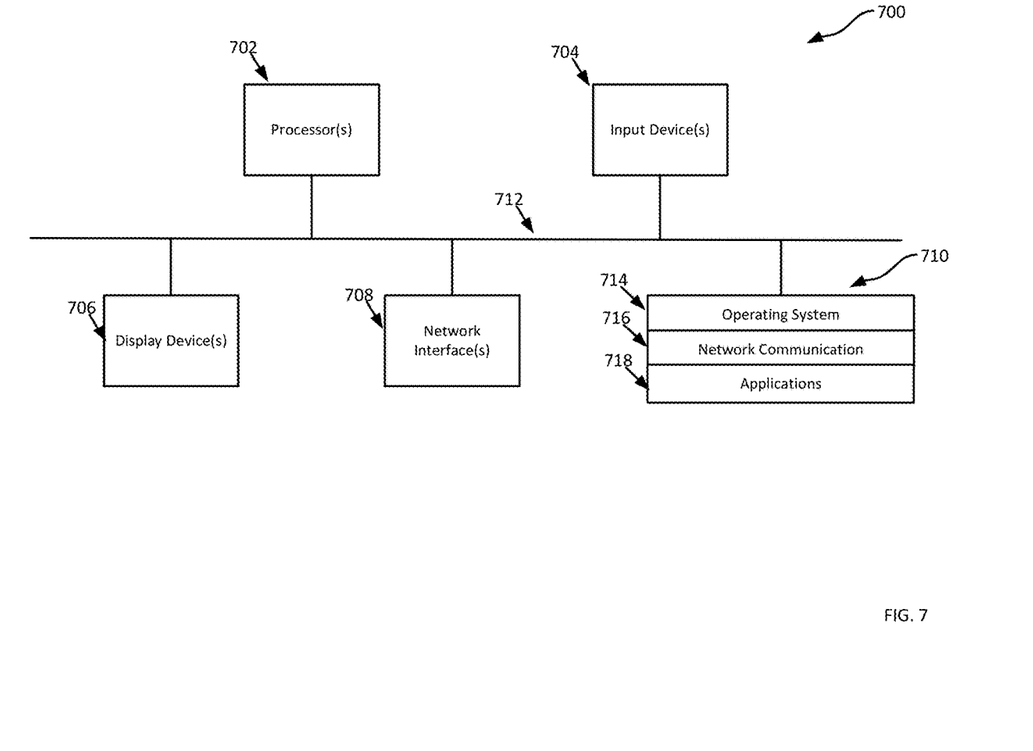
FIG. 7 shows a block diagram of an example computing system that implements various features and processes of the hybrid bi-directional user experience system, based on the principles disclosed herein.

FIG. 7 shows a block diagram of an example computing device 700 that is configured for facilitating the hybrid bi-directional user experience system based on the principles disclosed herein. For example, computing device 700 may function as the servers 604, 606, 608, 612 and/or user device 602, or a portion or combination thereof in some embodiments. The computing device 700 performs one or more steps of the methods shown in FIGS. 1-5. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 710. Each of these components is coupled by a bus 712.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 712 includes any internal or external bus technology, including but not limited to ISA, EISA, PCI, PCI Express, USB, Serial ATA or FireWire. Computer-readable medium 710 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 establish and maintain network connections (e.g., software for implementing communication protocols, such as TCP/IP, HTTP, Ethernet, telephony, etc.). Application(s) 718 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user devices and servers. A user device and server may generally be remote from each other and may typically interact through a network. The relationship of user device and server may arise by virtue of computer programs running on the respective computers and having a relationship with each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A method performed by a processor, the method comprising:
   executing a first session on a first software application;
   executing a second session on a second software application, the second software application being a migrated version of the first software application;
   receiving requests from a user to execute application features;
   bi-directionally redirecting the user between the first session executing on the first software application and the second session executing on the second software application based on an availability of the requested application features in the second software application which is a partially functional migration of the first software application;
   redirecting the user from the first session executing on the first software application to the second session executing on the second software application when the requested application features are available on the second software application; and
   redirecting the user from the second session executing on the second software application to the first session executing on the first software application when the requested application features are not available on the second software application.

2. The method of claim 1, further comprising:
   maintaining the user in the second session executing on the second software application when the requested application features is available on the second software application.

3. The method of claim 1, further comprising:
   bridging data between the first session executing on the first software application and the second session executing on the second software application.

4. The method of claim 3, further comprising:
bridging the data by accessing metadata of the first session and metadata of the second session, and bi-directionally mapping the metadata between the first session and the second session.

5. The method of claim 4, further comprising:
bridging the data by sending the mapped metadata to the first session executing on the first software application and the second session executing on the second software application.

6. The method of claim 1, further comprising:
comparing data from the first session executing on the first software application and the data from second session executing on the second software application to provide synchronization between the data.

7. The method of claim 6, further comprising:
updating and synchronizing the data when the comparing indicates a discrepancy between the data from the first session executing on the first software application and the data from second session executing on the second software application.

8. The method of claim 1, further comprising:
bi-directionally redirecting the user between the first session executing on the first software application on a first hardware platform and the second session executing on the second software application on a second hardware platform.

9. A method performed by a processor, the method comprising:
executing a first session on a first software application;
executing a second session on a second software application, the second software application being a migrated version of the first software application;
receiving requests from a user to execute application features; and
bi-directionally redirecting the user between the first session executing on the first software application and the second session executing on the second software application based on an availability of the requested application features in the second software application which is a partially functional migration of the first software application, while maintaining a look and feel of a user interface displayed to the user during the first session and the second session.

10. A system comprising:
a non-transitory storage medium storing computer program instructions; and
one or more processors configured to execute the computer program instructions to cause operations comprising:
executing a first session on a first software application;
executing a second session on a second software application, the second software application being a migrated version of the first software application;
receiving requests from a user to execute application features;
bi-directionally redirecting the user between the first session executing on the first software application and the second session executing on the second software application based on an availability of the requested application features in the second software application which is a partially functional migration of the first software application;

redirecting the user from the first session executing on the first software application to the second session executing on the second software application when the requested application features are available on the second software application; and
redirecting the user from the second session executing on the second software application to the first session executing on the first software application when the requested application features are not available on the second software application.

11. The system of claim 10, wherein the operations further comprise:
maintaining the user in the second session executing on the second software application when the requested application features is available on the second software application.

12. The system of claim 10, wherein the operations further comprise:
bi-directionally redirecting the user between the first session executing on the first software application and the second session executing on the second software application while maintaining a look and feel of a user interface displayed to the user during the first session and the second session.

13. The system of claim 10, wherein the operations further comprise:
bridging data between the first session executing on the first software application and the second session executing on the second software application.

14. The system of claim 13, wherein the operations further comprise:
bridging the data by accessing metadata of the first session and metadata of the second session, and bi-directionally mapping the metadata between the first session and the second session.

15. The system of claim 14, wherein the operations further comprise:
bridging the data by sending the mapped metadata to the first session executing on the first software application and the second session executing on the second software application.

16. The system of claim 10, wherein the operations further comprise:
comparing data from the first session executing on the first software application and the data from second session executing on the second software application to provide synchronization between the data.

17. The system of claim 16, wherein the operations further comprise:
updating and synchronizing the data when the comparing indicates a discrepancy between the data from the first session executing on the first software application and the data from second session executing on the second software application.

18. The system of claim 10, wherein the operations further comprise:
bi-directionally redirecting the user between the first session executing on the first software application on a first hardware platform and the second session executing on the second software application on a second hardware platform.

* * * * *